(12) United States Patent
Oda et al.

(10) Patent No.: US 6,595,652 B2
(45) Date of Patent: Jul. 22, 2003

(54) SURFACE LIGHTING DEVICE

(75) Inventors: Masaharu Oda, Tokyo (JP); Rika Narumi, Kanagawa (JP); Mitsuo Tsuji, Tokyo (JP)

(73) Assignee: International Manufacturing and Engineering Services Co., Ltd., Kanagawa-ken (JP)

( * ) Notice: Subject to any disclaimer, the term of this patent is extended or adjusted under 35 U.S.C. 154(b) by 15 days.

(21) Appl. No.: 10/017,706

(22) Filed: Dec. 12, 2001

(65) Prior Publication Data

US 2002/0105793 A1 Aug. 8, 2002

Related U.S. Application Data

(63) Continuation-in-part of application No. 10/016,424, filed on Dec. 10, 2001, now abandoned.

(30) Foreign Application Priority Data

Dec. 12, 2000 (JP) .......................................... 2000-377388
Jul. 25, 2001 (JP) .......................................... 2001-225030

(51) Int. Cl.$^7$ ................................................. F21V 7/04
(52) U.S. Cl. ........................... 362/31; 362/26; 362/330; 362/331; 362/326; 362/558; 385/901; 349/64
(58) Field of Search ............................ 362/26, 31, 326, 362/328, 330, 331, 332, 333, 339, 558; 385/901, 146; 349/64, 65

(56) References Cited

U.S. PATENT DOCUMENTS

| 5,040,098 | A | * | 8/1991 | Tanaka et al. | 362/31 |
| 5,854,872 | A | * | 12/1998 | Tai | 385/133 |
| 5,999,685 | A | * | 12/1999 | Goto et al. | 385/146 |
| 6,290,364 | B1 | * | 9/2001 | Koike et al. | 362/31 |
| 6,322,225 | B1 | * | 11/2001 | Koike | 362/31 |
| 6,412,968 | B1 | * | 7/2002 | Ohkawa | 362/26 |
| 6,435,686 | B1 | * | 8/2002 | Gotou et al. | 362/31 |

* cited by examiner

*Primary Examiner*—Sandra O'Shea
*Assistant Examiner*—Ali Alavi
(74) *Attorney, Agent, or Firm*—McCormick, Paulding & Huber LLP

(57) ABSTRACT

A surface lighting device includes a light guiding plate having a light incident surface formed at one end surface and a light exit surface formed on a front surface thereof; an elongated light source facing the light incident surface; a light source reflector which reflects light emitted from the elongated light source toward the light incident surface; a prism sheet, wherein an array of minute parallel prism projections is formed on a surface thereof, the array of minute parallel prism projections facing the light exit surface; a regular reflection type reflector facing a rear surface of the light guiding plate; a light guiding device for guiding light emitted from the elongated light source to two portions of the light incident surface which respectively face opposite ends of the elongated light source; and a diffuser, formed on the light incident surface, which diffuses incident light thereon.

32 Claims, 8 Drawing Sheets

Fig.15
| | Central Intensity (Cd/m²) | Half Width Distribution Angle |
|---|---|---|
| Example 1 | 2860 | 42.2 |
| Comparative Example 1 | 1800 | 80.0 |
Fig.16
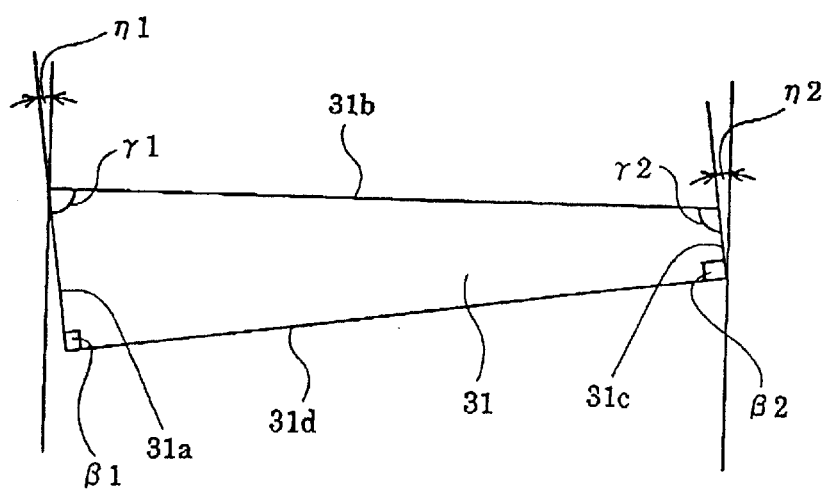
Fig.17
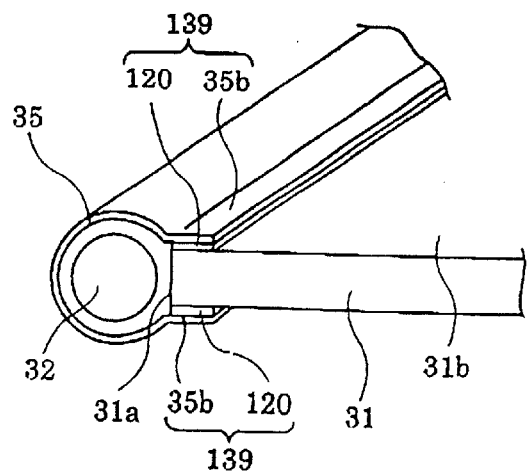

SURFACE LIGHTING DEVICE

CROSS-REFERENCE TO RELATED APPLICATIONS

This application is entitled to the benefit of and incorporates by reference essential subject matter disclosed in Japanese Patent Applications Nos. 2000-377388 and 2001-225030 filed on Dec. 12, 2000 and Jul. 25, 2001 in the name of International Manufacturing and Engineering Services Co., Ltd.

This application is a Continuation-In-Part Application of application Ser. No. 10/016,424. filed on Dec. 10, 2001.

BACKGROUND OF THE INVENTION

1. Field of the Invention

The present invention relates to an edge-light type surface lighting device (e.g., an LCD panel lighting device) which is used for LCDs for, e.g., notebook personal computers and LCD TV sets.

2. Description of the Related Art

In recent years color LCDs have been widely used in various applications, including notebook personal computers, cellular phones and LCD TV sets. As information technology moves forward, LCDs have been required to have performance which fills particular needs in response to the increase in quantity of information to be managed, diversity of needs, and multimedia compatibility. A common challenge for manufacturers is to increase the brightness and the resolution of LCDs in order to meet such requirements.

LCDs are generally constructed in two parts: an LCD panel and a surface lighting device (back light unit). The construction of the surface lighting device can be divided roughly into two types: direct and edge light types. In the direct type, a light source (e.g., CCFL tubes) is placed under an emission plane. The Edge-light type of surface lighting devices use a straight lamp (CCFL lamp) along an end face of the LCD, two lamps on opposite end faces of the LCD, or L-shaped lamps along the opposite corners of the LCD. The edge-light type has become more widespread than the direct type because the edge-light type is advantageous for reducing the size of the LCD.

Mobile notebook personal computers and TV sets that adopt a color LCD generally use a battery (e.g., a rechargeable NiMH pack or a lithium-ion battery pack). The color LCD, especially the surface lighting device thereof, consumes most of the power of the battery. Accordingly, reducing power consumption of the surface lighting device as low as possible has been a significant challenge to manufacturers to extend battery life and improve the practical value of LCDs.

However, if a reduction in power consumption of the surface lighting device sacrifices the brightness thereof, the contrast becomes low, which is not preferable. It is desired to reduce power consumption of the surface lighting device while increasing the brightness thereof by improving optical efficiency of the surface lighting device.

In response to such a desire, a new type of surface lighting device has been developed. In this new type of surface lighting device, a lens unit is formed directly on a light exit surface of a light guiding plate (which serves an element of the surface lighting device), while a prism sheet, on which an array of prisms each having a triangular cross section is formed, is positioned on the light guiding plate so that the prism array faces the light guiding plate. According to this construction, light which is condensed by the lens unit that is formed on the light guiding plate is emitted obliquely from the light guiding plate and is subsequently directed toward the front of the device to thereby achieve a high brightness.

Another type of surface lighting device having a light guiding plate on which linear projections and depressions are formed to extend in a direction substantially perpendicular to the light incident surface of the light guiding plate has been developed. According to this structure, the spread of light in a direction parallel to the light incident surface of the light guiding plate is condensed by the lens effect that is produced by the linear projections and depressions to thereby achieve a high brightness.

If there is any defect on the screen of the LCD, the defect becomes an eyesore and thus is perceived as a serious defect since the user usually constantly looking at the screen. Such a defect can be in the form or, e.g., bright and dark streaks which occur in the vicinity of an end face of the light guiding plate. A part of the screen of the LCD which faces a non-light emitting portion of the surface lighting device, e.g., in the vicinity of either end of a straight lamp where an electrode portion thereof exits, is seen slightly darker than the remaining part of the screen, especially if the light guiding plate has a light incident surface which is longer than the length of a light emitting portion of the straight lamp.

In order to overcome this problem, it has been proposed that the light incident surface of the light guiding plate be formed as a mat surface so that the incident light thereon is diffused thereby to reduce the occurrence of the bright and dark streaks.

However, if the brightness of the surface lighting device is increased to meet the recent demand for the further enhancement of the brightness of LCDs, the aforementioned defect becomes more apparent.

In a typical edge-light type surface lighting device, a light bundle emitted from a straight lamp is made incident on an end face of a light guiding plate so as to exit from a light exit surface defined on one side of the light guiding plate. An LCD panel is positioned on the light exit surface with one or more diffusion sheets and/or prism sheets being positioned between the LCD panel and the light exit surface. Each prism sheet is a conventional optical element which is provided thereon with an array of minute parallel prism projections to have refractive and reflective functions. The light bundles emitted from the light exit surface of the light guiding plate are directed to the LCD panel via the prism sheet. Although one or two thicknesses of prism sheets are generally used, there is a limit of gathering the diffused light with the prism sheets.

SUMMARY OF THE INVENTION

An object of the present invention is to provide a surface lighting device which illuminates an LCD panel entirely with less unevenness in luminance distribution. Another object of the present invention is to provide a surface lighting device with a high brightness which improves the quality of images indicated on an LCD panel.

To achieve the object mentioned above, according to an aspect of the present invention, a surface lighting device is provided, including a light guiding plate having a light incident surface formed at one end surface of the light guiding plate and a light exit surface formed on a front surface of the light guiding plate; an elongated light source which faces the light incident surface; a light source reflector which reflects light emitted from the elongated light source toward the light incident surface; a prism sheet, wherein an array of minute parallel prism projections is formed on a surface of the prism sheet, the prism sheet being positioned so that the array of minute parallel prism projections faces the light exit surface; a regular reflection type reflector positioned to face a rear surface of the light guiding plate; a light guiding device for guiding light emitted from the elongated light source to each of two portions of the light incident surface which respectively face opposite ends of the elongated light source; and a diffuser, formed on the light incident surface, which diffuses incident light thereon.

In an embodiment, a diffusion reflector is formed on the regular reflection type reflector, which diffuses part of incident light on the regular reflection type reflector.

In an embodiment, the light incident surface is inclined with respect to a plane normal to the light exit surface.

Preferably, the light guiding plate includes a first array of minute parallel prism projections formed on one of the front surface and the rear surface of the light guiding plate to extend in a first direction, and a second array of minute parallel prism projections formed on the other of the front surface and the rear surface of the light guiding plate to extend in a second direction perpendicular to the first direction.

Preferably, the above-mentioned first direction is parallel to an axial direction of the elongated light source.

In an embodiment, the light guiding plate has a substantially wedge shape cross section, wherein a thickness of the light guiding plate gradually decreases in a direction away from the light incident surface. A first angle between the light incident surface and the light exit surface of the light guiding plate and a second angle between the light incident surface and the rear surface of the light guiding plate are an acute angle and either a right angle or an obtuse angle, respectively.

Preferably, the light incident surface, which is formed on one end surface of the light guiding plate, and the other end surface of the light guiding plate, which is positioned on the opposite side of the light guiding plate from the light incident surface thereof, are parallel to each other.

In an embodiment, the light source reflector includes a second diffuser which diffuses light emitted from the elongated light source.

In an embodiment, the light source reflector includes an extraordinary ray shield device which prevents light emitted from the elongated light source from being incident on the light exit surface from the front side thereof, and further prevents other light emitted from the elongated light source from being incident on the rear surface of the light guiding plate from the rear side thereof.

In an embodiment, the extraordinary ray shield device includes front and rear tongue portions formed integral with the light source reflector to extend in a direction away from the elongated light source along the light exit surface and the rear surface of the light guiding plate, respectively; and front and rear low-reflectivity areas positioned between the front tongue portion and the light exit surface of the light guiding plate and between the rear tongue portion and the rear surface of the light guiding plate, respectively.

In an embodiment, the front and rear low-reflectivity areas are formed on the front and rear tongue portions, respectively.

In an embodiment, the light guiding device includes two light guiding members fixed at the opposite ends of the elongated light source to surround two electrode portions formed at the opposite ends of the elongated light source, respectively.

In an embodiment, each of the two light guiding members is formed as a cylindrical cap to be fitted on a corresponding one of the electrode portions.

In an embodiment, the light guiding device includes two inclined surface portions formed on the light incident surface at opposite ends thereof in the vicinity of two electrode portions which are formed at the opposite ends of the elongated light source, respectively. Each of the two inclined surface portions is inclined with respect to the elongated light source to gradually approach a corresponding one of the electrode portions in a direction away from a central surface portion of the light incident surface.

In an embodiment, the light guiding device includes two arc surface portions formed on the light incident surface at opposite ends thereof in the vicinity of two electrode portions which are formed at the opposite ends of the elongated light source, respectively. Each of the two arc surface portions is curved to gradually approach a corresponding one of the electrode portions in a direction away from a central surface portion of the light incident surface.

In an embodiment, the light guiding device includes at least one first surface on which part of the light emitted from the elongated light source is incident, and at least one second surface which reflects the light incident on the at least one first surface to proceed toward the inside of the light guiding plate.

Preferably, the at least one first surface is angled relative to the at least one second surface by an angle of approximately 40 to 55 degrees.

Preferably, the at least one first surface and the at least one second surface constitute a plurality of first surfaces and a plurality of second surfaces, respectively, which form two sawtooth-like portions on the light incident surface at opposite ends thereof.

In an embodiment, each of the at least one first surface and the at least one second surface is formed as a mat surface.

In an embodiment, the light incident surface is formed as a mat surface.

Preferably, a central average surface height of the mat surface is in a range of $0.4\mu$ to $1.0\ \mu m$.

In an embodiment, the prism sheet includes an extraordinary ray shield device which prevents light emitted from the elongated light source from being incident on the light exit surface from front thereof.

In an embodiment, the prism sheet is slightly shifted relative to the light guiding plate in a direction away from the light incident surface so that a predetermined space is formed between the light shield strip and the light exit surface, wherein the extraordinary ray shield device includes a light shield strip which is positioned above the predetermined space to extend from one end of the prism sheet which faces the elongated light source.

Preferably, a width of the space between the light incident surface and the one end of the prism sheet, in a direction perpendicular to a longitudinal direction of the light incident surface and parallel to the light exit surface, is in a range of 0.5 mm to 10.0 mm.

In an embodiment, each of the light guiding plate and the regular reflection type reflector is formed as a rectangular plate; and the diffusion reflector includes two diffusion reflector surfaces formed on a front surface of the regular reflection type reflector at two corners thereof facing the opposite ends of the elongated light source, respectively.

In an embodiment, each of the two diffusion reflector surfaces includes an ink print pattern printed on the front surface of the regular reflection type reflector so that the degree of light diffusion of the diffusion reflector surface decreases in a direction toward a center of the front surface of the regular reflection type reflector, wherein ink having a high diffusion reflectance is used to print the ink print pattern.

In an embodiment, the diffusion reflector includes a diffusion reflector surface formed on a front surface of the regular reflection type reflector to extend parallel to the elongated light source along a side of the regular reflection type reflector which is adjacent to the elongated light source.

In an embodiment, the diffusion reflector surface includes an ink print pattern printed on the front surface of the regular reflection type reflector so that the degree of light diffusion of the diffusion reflector surface increases in a direction toward an end of the regular reflection type reflector which is adjacent to the elongated light source, wherein ink having a high diffusion reflectance is used to print the ink print pattern.

According to another aspect of the present invention, a surface lighting device is provided, including a light guiding plate having a light incident surface formed at one end surface of the light guiding plate and a light exit surface formed on a front surface of the light guiding plate; and an elongated light source which faces the light incident surface. The light incident surface is inclined with respect to a plane normal to the light exit surface.

Preferably, the light guiding plate includes a first array of minute parallel prism projections formed on one of the front surface and the rear surface of the light guiding plate to extend in a first direction, and a second array of minute parallel prism projections formed on the other of the front surface and the rear surface of the light guiding plate to extend in a second direction perpendicular to the first direction.

In an embodiment, the light guiding plate has a substantially wedge shape cross section, wherein a thickness of the light guiding plate gradually decreases in a direction away from the light incident surface. A first angle between the light incident surface and the light exit surface of the light guiding plate and a second angle between the light incident surface and the rear surface of the light guiding plate are an acute angle and either a right angle or an obtuse angle, respectively.

Preferably, the light incident surface, which is formed on the one end surface of the light guiding plate, and the other end surface of the light guiding plate, which is positioned on the opposite side of the light guiding plate from the light incident surface thereof, are parallel to each other.

The present disclosure relates to subject matter contained in Japanese Patent Applications Nos.2000-377388 (filed on Dec. 12, 2000) and 2001-225030 (filed on Jul. 25, 2001) which are expressly incorporated herein by reference in their entireties.

BRIEF DESCRIPTION OF THE DRAWINGS

The present invention will be described below in detail with reference to the accompanying drawings in which:

FIG. 15 is a data table of the intensity at a central portion of the light guiding plate and the half width distribution angle in Example 1 and Comparative Example 1;

FIG. 16 is another embodiment of the light guiding plate shown in FIG. 6;

FIG. 17 is a fragmentary perspective view of fundamental elements of the sixth embodiment of the surface lighting device according to the present invention;

DESCRIPTION OF THE PREFERRED EMBODIMENTS

Figure 1:
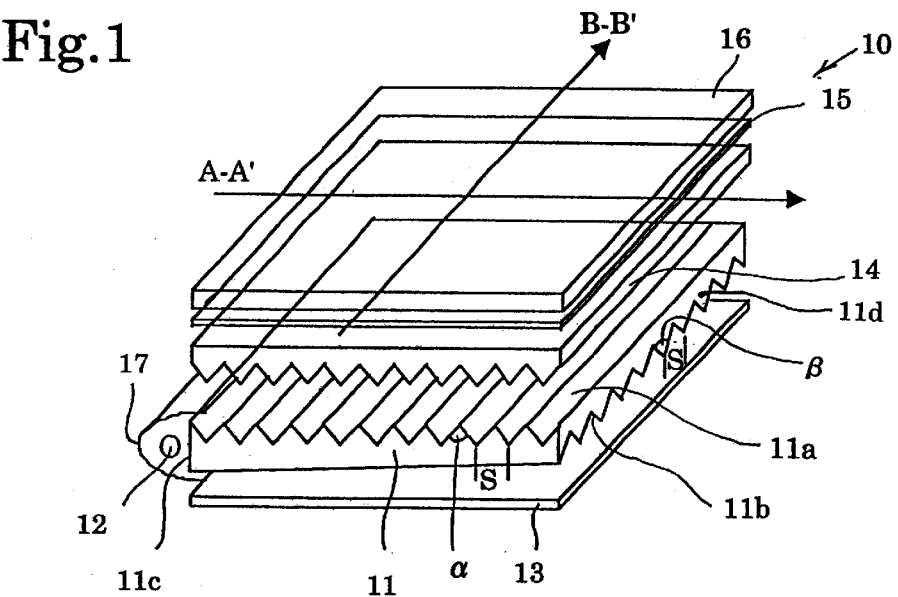
FIG. 1 is an exploded perspective view of the first embodiment of a surface lighting device according to the present invention.
Figure 2:
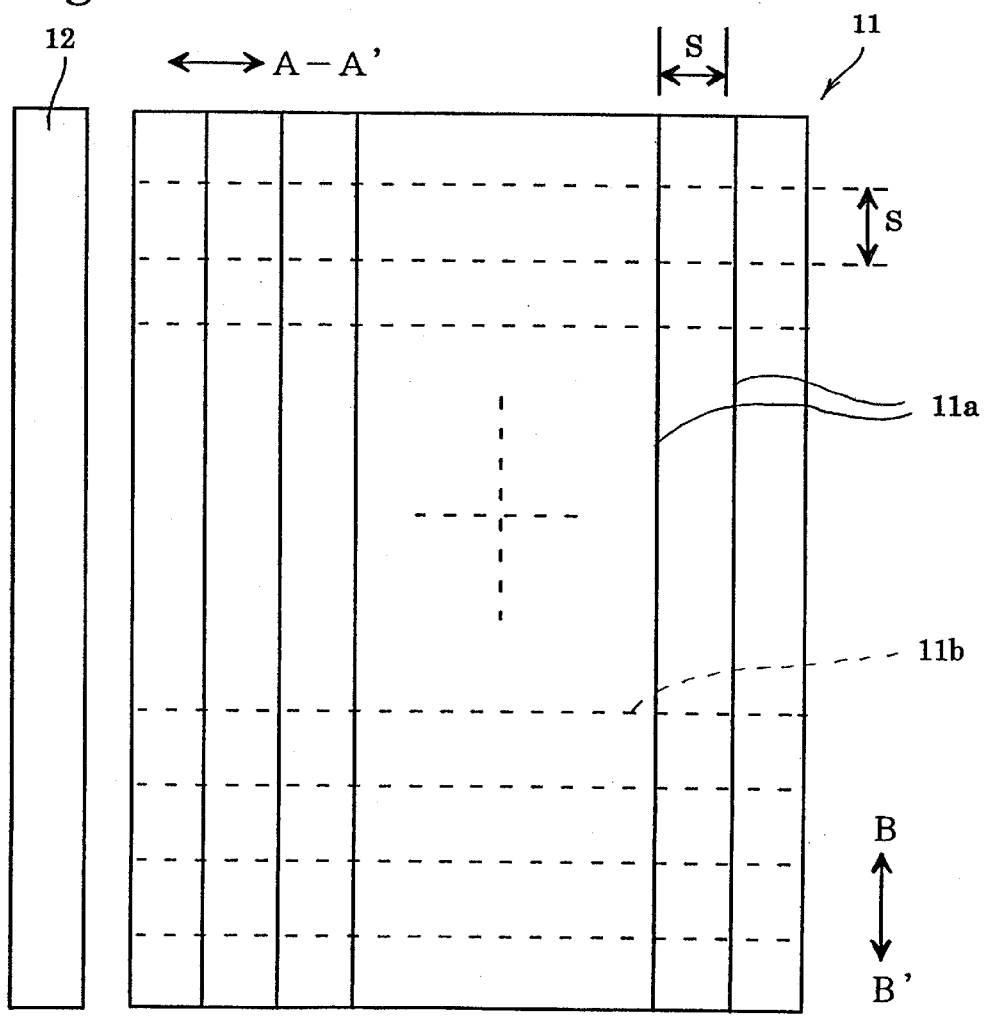
FIG. 2 is a plan view of a light guiding plate and a straight lamp which are shown in FIG. 1.

The first embodiment of a surface lighting device 10 shown in FIG. 1, which serves as an LCD panel lighting device, is provided with a light guiding plate 11 and a straight lamp (fluorescent tube) 12. The surface lighting device 10 is further provided with a reflector plate 13, a prism sheet 14, a diffusion sheet 15, an LCD panel 16 and a reflector 17. The reflector plate 13 is of a regular reflection type which reflects the incident light so that the angle of reflection of the light is equal to the angle of incidence and on the opposite side of the normal to the point of incidence. The light guiding plate 11 is formed having a rectangular shape in plan view, and is made of a resin material through which light can pass. The light guiding plate 11 is provided on one end face thereof with a light incident surface 11c. The straight lamp 12 is positioned adjacent to the light incident surface 11c and extends along the light incident surface 11c. The light guiding plate 11 is provided on a front surface (the upper surface as viewed in FIG. 1) thereof with a first array of minute parallel prism projections 11a extending parallel to the straight lamp 12. The light guiding plate 11 is provided on a rear surface (lower surface as viewed in FIG. 1) thereof with a second array of minute parallel prism projections 11b extending in a direction perpendicular to the straight lamp 12. Accordingly, the first and second arrays of minute parallel prism projections 11a and 11b extend in directions perpendicular to each other. FIG. 2 shows this orthogonal relationship between the first and second arrays of minute parallel prism projections 11a and 11b schematically. The interior angle α (see FIG. 1) of the apex of each prism projection of the first array of prism projections 11a is preferably in the range of approximately 165 to 177 degrees, and the interior angle β (see FIG. 1) of the apex of each prism projection of the second array of the prism projections 11b is preferably in the range of approximately 120 to 150 degrees. The pitch S (see FIG. 1) of prism projections of each array of the first and second arrays 11a and 11b is preferably in the range of approximately 20 to 90 μm. The first array of prism projections 11a and the second array of prism projections 11b can be formed on the rear surface and the front surface (the light exit surface) of the light guiding plate 11, respectively. In this case, the interior angle α of the apex of each prism projection of the first array of prism projections 11a is preferably in the range of approximately 165 to 177 degrees, while the interior angle β of the apex of each prism projection of the second array of the prism projections 11b is preferably in the range of approximately 85 to 95 degrees. The first and second arrays of prism projections 11a and 11b are integrally formed with the light guiding plate 11 when the light guiding plate 11 is molded. Namely, an ultra-precise molding die (not shown) for molding the light guiding plate 11 is provided with minute projections and depressions which respectively correspond to the minute depressions and projections that form each array of prism projections 11a and 11b. The light guiding plate 11 can be entirely made of, e.g., an acrylic resin.

The light guiding plate 11 is positioned on the reflector plate 13. The prism sheet 14, the diffusion sheet 15 and the LCD panel (LCC: liquid crystal cell) 16 are positioned on the light guiding plate 11, in that order in a direction from the rear side to the front side of the surface lighting device 10. Each of the reflector plate 13, the prism sheet 14, the diffusion sheet 15 and the LCD panel 16 is formed having a rectangular shape in plan view so as to correspond to the shape in plan view of the light guiding plate 11.

As shown in FIG. 1, the straight lamp 12 is surrounded by the reflector 17 having a substantially U-shaped cross section in a plate perpendicular to the axis of the straight lamp 12. The light which is emitted from the straight lamp 12 in a direction toward the light incident surface 11c (i.e., to the right as viewed in FIG. 1) is incident directly on the light incident surface 11c, while the light which is emitted from the straight lamp 12 in a direction away from the light incident surface 11c is reflected by the inner surface of the reflector 17 to be incident on the light incident surface 11c.

Accordingly, the light bundle emitted by the straight lamp 12 enters into the light guiding plate 11 via the light incident surface 11c thereof. Subsequently, the light bundle is reflected more than once by inner surfaces of the light guiding plate 11, and part of the light bundle exits from the light guiding plate 11 via the first array of prism projections 11a to be incident on the prism sheet 14 and the diffusion sheet 15 to illuminate the LCD panel 16 from behind. Another part of the light bundle exits from the light guiding plate 11 via the second array of prism projections 11b to be incident on the reflector plate 13, and is subsequently reflected thereby to re-enter the light guiding plate 11 via the second array of prism projections 11b, and eventually exits from the light guiding plate 11 via the first array of prism projections 11a to be incident on the prism sheet 14 and the diffusion sheet 15 to illuminate the LCD panel 16 from behind. The first array of prism projections 11a has a function to make the light that travels in the light guiding plate 11 exit from the front thereof. The interior angle α (see FIG. 1) of the apex of each prism projection of the first array of prism projections 11a is determined so that the light that travels in the light guiding plate 11 can exit from the front thereof as uniformly as possible. On the other hand, the second array of prism projections 11b serves as a condensing lens which concentrates the light that is reflected by the rear surface of the light guiding plate 11 toward the front thereof. This also increases the brightness of the surface lighting device.

Accordingly, adopting the light guiding plate 11, each side of which an array of prism projections (11a or 11b) is formed integral with, makes it possible to reduce the number of costly prism sheets. This is advantageous for reducing the number of elements of the surface lighting device 10 and the cost of production thereof.

Figure 4:
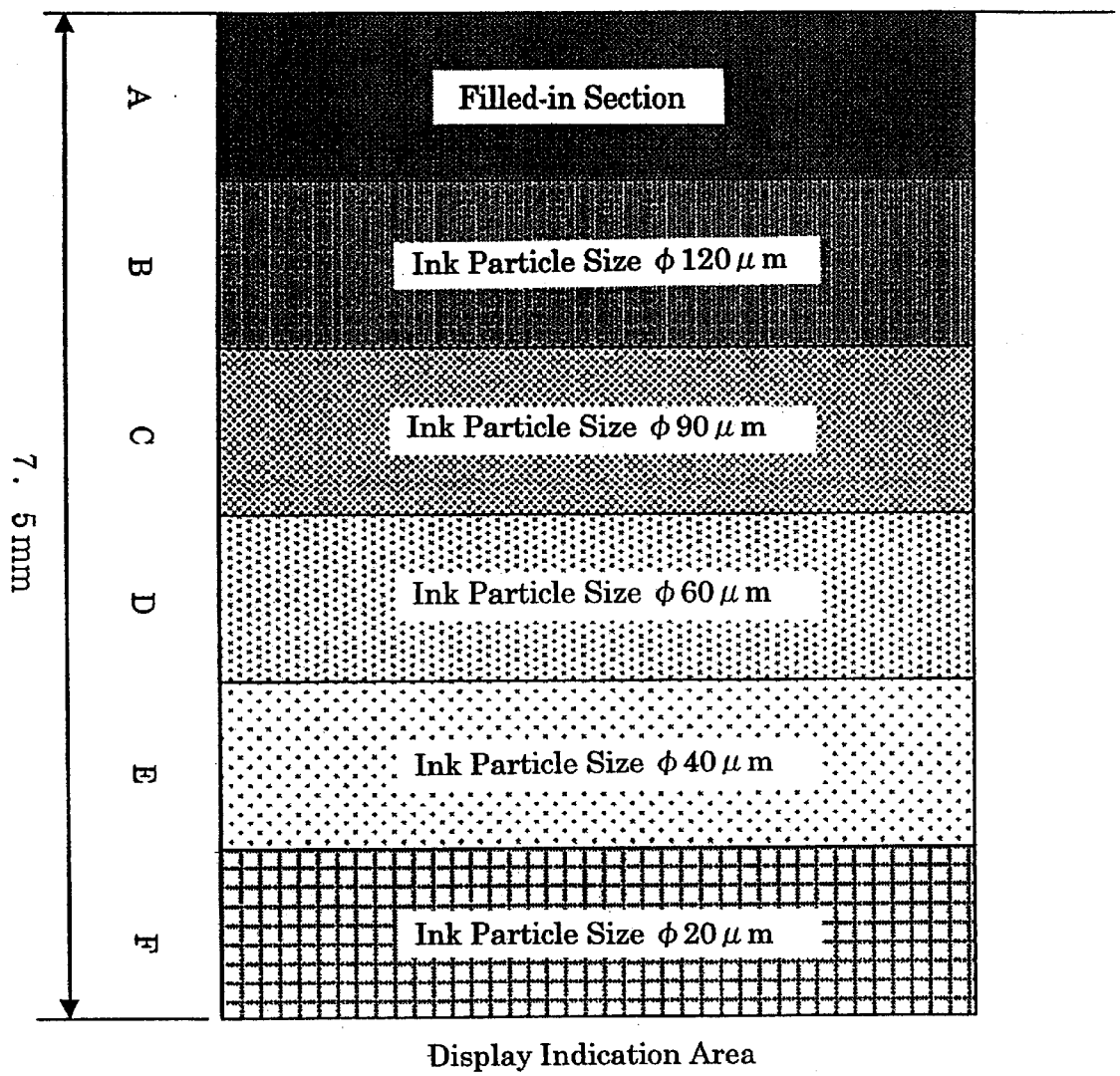
FIG. 4 is an explanatory view of the print pattern shown in FIG. 3.
Figure 6:
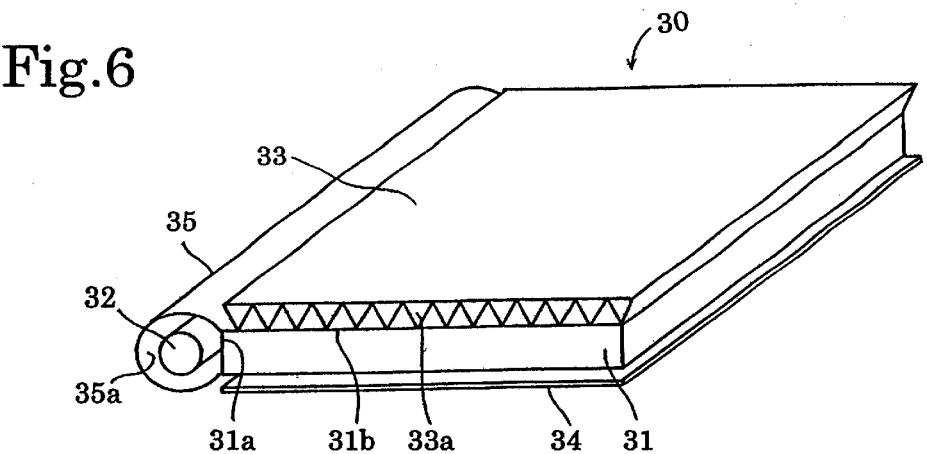
FIG. 6 is a perspective view of the second embodiment of the surface lighting device according to the present invention.
Figure 7:
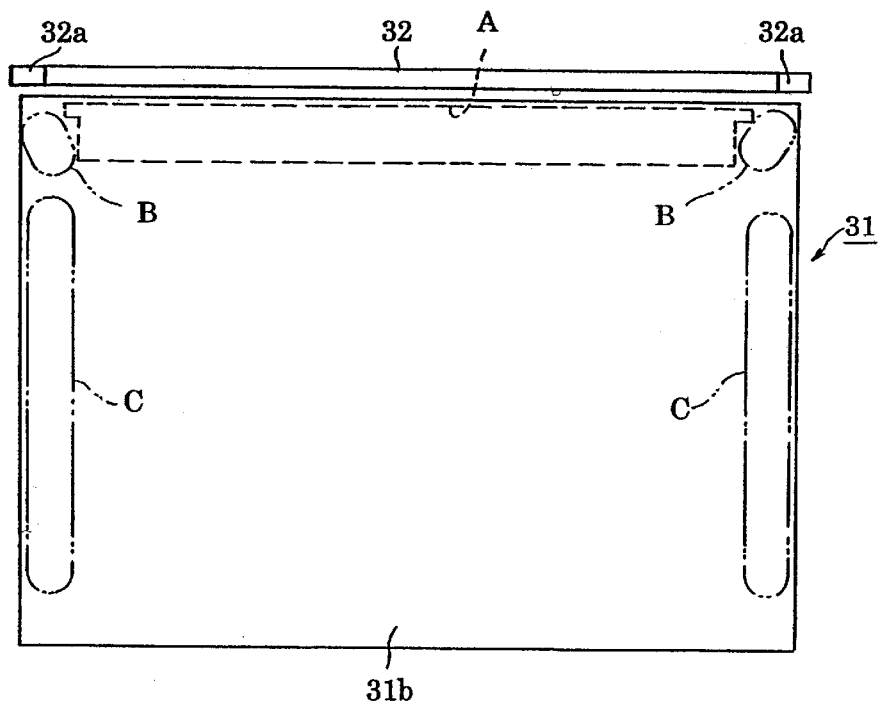
FIG. 7 is a plan view of a light guiding plate and a straight lamp which are shown in FIG. 6.
Figure 9:
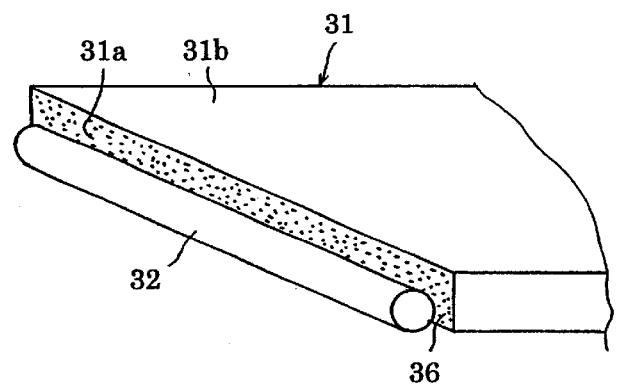
FIG. 9 is a fragmentary perspective view of a fundamental portion of the second embodiment of the surface lighting device.

FIGS. 6 and 7 show the second embodiment of the surface lighting device. The second embodiment of the surface lighting device 30, which serves as an LCD panel lighting device, is provided with a light guiding plate 31 and a straight lamp (fluorescent tube/elongated light source) 32. The surface lighting device 30 is further provided with a prism sheet 33, a reflector plate (regular reflection type reflector) 34 and a tube-like reflector (light source reflector) 35. The reflector plate 34 is a regular reflector type. The light guiding plate 31 is formed having a rectangular shape in plan view, and is made of a resin material which can transmit light therethrough. The straight lamp 32 is positioned along an end face of the light guiding plate 31. The light guiding plate 31 is provided on one end face thereof with a light incident surface 31a which faces the straight lamp 32. The front surface (upper surface as viewed in FIG. 6) of the light guiding plate 31 is formed as a light exit surface 31b. The reflector plate 34 is positioned behind the light guiding plate 31. The reflector plate 34 reflects the light which exits from the rear surface of the light guiding plate 31 back toward the light exit surface 31b to thereby achieve a high brightness because the reflector plate 34 is not influenced by diffusion. The light incident surface 31a of the light guiding plate 31 is formed as a mat surface to make the light incident surface 31a serve as a diffusion surface (diffuser) 36 (see FIG. 9) through which the incident light on the light incident surface 31a is diffused. Central average surface height Ra of the light incident mat surface 31a is in the range of 0.4 to 1.0 μm. Although the diffusion surface 36 shown in FIG. 4 is formed as a mat surface, the diffusion surface can be formed any other way as long as the incident light on the light incident surface 31a can be diffused thereby.

The prism sheet 33 is provided on a rear side (lower side as viewed in FIG. 6) thereof with an array of minute parallel prism projections 33a each having a triangular cross section. The prism sheet 33 is positioned on the light guiding plate 31 so that the array of prism projections 33a face the light guiding plate 31.

Figure 10A:
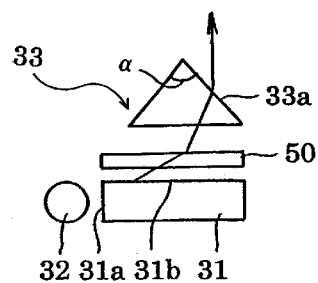
FIG. 10A is a schematic diagram of fundamental optical elements of a comparative example of a surface lighting device having a typical arrangement of the fundamental optical elements.

FIG. 10A is a schematic diagram of fundamental optical elements of a comparative example of a surface lighting device having a typical arrangement of the fundamental optical elements. In this comparative example of the surface lighting device, the prism sheet 33 is positioned on the light guiding plate 31 so that the apexes of the prism projections 33a face in a direction away from the light exit surface 31b of the light guiding plate 31. In this case, it is preferable that the interior angle α shown in FIG. 10A be approximately 90 degrees. Since the apexes of the prism projections 33a face in a direction away from the light exit surface 31b, a diffusion sheet 50 is positioned between the prism sheet 33 and the light guiding plate 31, as shown in FIG. 10A, to lead the light which exits from the light exit surface 31b of the light guiding plate 31 to the front (the upper side as viewed in FIG. 10A) of the surface lighting device upon refraction of the prism projections 33a.

Figure 10B:
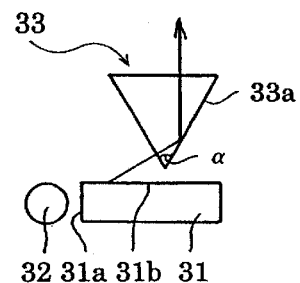
FIG. 10B is a view similar to that of FIG. 10A, showing a schematic diagram of fundamental elements of the second embodiment of the surface lighting device.

FIG. 10B is a view similar to that of FIG. 10A, and shows a schematic diagram of fundamental elements of the second embodiment of the surface lighting device 30. As shown in FIG. 10B, in the second embodiment of the surface lighting device 30, the prism sheet 33 is positioned on the light guiding plate 31 so that the apexes of the prism projections 33a face the light exit surface 31b of the light guiding plate 31. In this case, it is preferable that the interior angle α shown in FIG. 10B be approximately 60 to 70 degrees.

In the second embodiment of the surface lighting device 30 shown in FIG. 6, the light which exits from the light exit surface 31b of the light guiding plate 31 is incident directly on the prism sheet 33 to be led to the front of the surface lighting device 30 via the refractivity of the prism projections 33a.

Accordingly, in the second embodiment of the surface lighting device, the light gathered via the light guiding plate 31 exits from the light guiding plate as shown in FIG. 10B. This allows a remarkable increase in the brightness in the light exit surface 31b of the light guiding plate 31 in comparison with the structure shown in FIG. 10A.

In the case where a portable power supply (e.g., a battery pack) is used as a power supply for the surface lighting device, the power supplied from the portable power supply to the surface lighting device can be reduced to a minimum by switching the brightness of the surface lighting device to minimum brightness which substantially extends the battery life.

As shown in FIG. 6, the straight lamp 32 is surrounded by the tube-like reflector 35. The tube-like reflector 35 has a C-shaped cross section in a plane perpendicular to the axis of the straight lamp 32, so that a portion of the tube-like reflector 35 which faces the light incident surface 31a is open. Therefore, the light which is emitted from the straight lamp 32 in a direction toward the light incident surface 31a (i.e., to the right as viewed in FIG. 6) is incident directly on the light incident surface 31a via the opening of the tube-like reflector 35, and the light which is emitted from the straight lamp 32 in a direction away from the light incident surface 31a is reflected by the tube-like reflector 35 to be incident on the light incident surface 31a via the opening of the tube-like reflector 35.

The tube-like reflector 35 is provided, on the inner surface thereof that faces the straight lamp 32, with a diffusion reflector surface 35a such as a diffusion sheet that adheres to the inner surface of the tube-like reflector 35.

With the above-described arrangement in which the tube-like reflector 35 and the light incident surface 31a of the light guiding plate 31 are respectively provided with the diffusion reflector surface 35a and the diffusion surface 36, the light emitted by the straight lamp 32 is diffused by the diffusion reflector surface 35a and the diffusion surface 36 so as to enter into the light guiding plate 31 uniformly. This prevents bright and dark streaks A (see FIG. 7) from occurring in the vicinity of the end of the light exit surface 31b of the light guiding plate 31 which is adjacent to the straight lamp 32, which in turn prevents a difference in brightness between a portion of the light guiding plate 31 in the vicinity of the light exit surface 31b and a central portion of the light guiding plate 31 from occurring. Consequently, the brightness on the light exit surface 31b becomes even.

As shown in FIG. 7, the straight lamp 32 is provided at the opposite ends thereof with electrode portions 32a (non-light emitting portions). The greater the screen size of the notebook personal computer, the shorter the length of the straight lamp 32 (except the length of each electrode portions 32a) becomes with respect to the length of the light incident surface 31a. If the length of the straight lamp 32, excluding the length of each electrode portion 32a, is shorter than the length of the light incident surface 31a, namely, if the length of a light emitting portion of the straight lamp 32 is shorter than the length of the light incident surface 31a, a dark portion B (see FIG. 7) occurs at each of two corners of the light guiding plate 31 (which respectively face the opposite ends of the straight lamp 32) due to lack of light amount.

Figure 8:
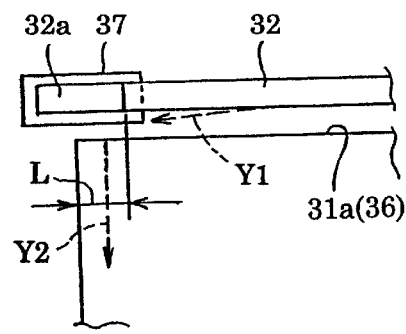
FIG. 8 is a fragmentary plan view of a fundamental portion of the second embodiment of the surface lighting device.

To prevent this problem from occurring, in the second embodiment of the surface lighting device 30, a light guiding member (light guiding device) 37 is fixed at each of the opposite ends of the straight lamp 32, i.e., at each electrode portion 32a (see FIG. 8). Each light guiding member 37 guides light emitted from the straight lamp 32 to that portion of the light incident surface 31a which faces the corresponding end of the straight lamp 32. Each light guiding member 37 is in the shape of a cylindrical cap, the outer end of which (the left end as viewed in FIG. 8) is closed, and is made of a transparent or translucent material (e.g., a glass or a transparent acrylic resin). Each cylindrical light guiding member 37 is fitted on the corresponding electrode portion 32a so as to surround the same.

Each cylindrical light guiding member 37 receives a first ray of light Y1 (shown by an arrow in FIG. 8) emitted obliquely from the straight lamp 32, and projects the received ray of light Y1 as a second ray of light Y2 (shown by an arrow in FIG. 8) toward that portion of the light incident surface 31a which faces the corresponding end of the straight lamp 32 within a range L shown in FIG. 8. This increases the brightness at each of two corners of the light guiding plate 31 which respectively face the opposite ends of the straight lamp 32, which in turn prevents the dark portion B from occurring at each of the two corners of the light guiding plate 31.

Notebook personal computers are generally small in size and are often carried from one place to another, so that the straight lamp 32 must be resistant to vibration. The cylindrical light guiding members 37 respectively receive and hold the electrode portions 32a of the straight lamp. Consequently, the cylindrical light guiding members 37 reinforce the fixing parts of the electrode portions 32a of the straight lamp 32, and increase the resistance of the electrode portions 32a to vibration.

Figure 11:
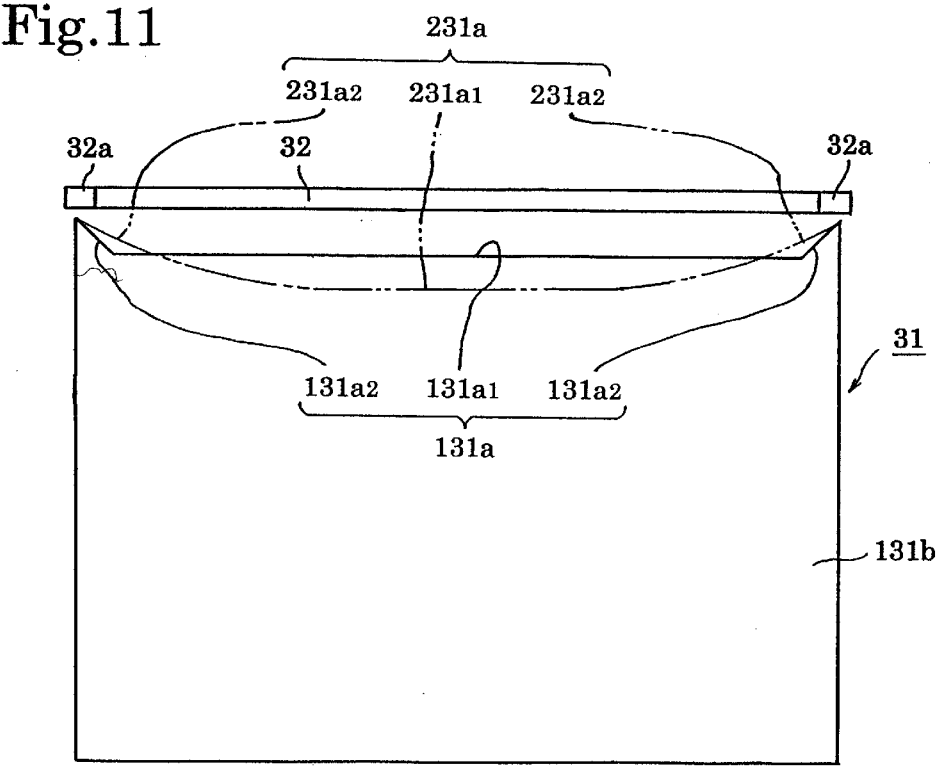
FIG. 11 is a plan view of a light guiding plate and a straight lamp of the third embodiment of the surface lighting device according to the present invention.

The effect of preventing the dark portion B from occurring at each of the two corners of the light guiding plate 31 can be attained by not only the above described structure shown in FIG. 8 but also the structure shown in FIG. 11. FIG. 11 shows the light guiding plate 31 and the straight lamp 32 of the third embodiment of the surface lighting device. The third embodiment of the surface lighting device is substantially the same as the second embodiment of the surface lighting device 30 shown in FIGS. 6 and 7 except that the light guiding members 37 shown in FIG. 8 are not used and that the light guiding plate 31 is provided with a light incident surface 131a having a particular shape unique to the third embodiment of the surface lighting device, instead of the flat light incident surface 31a of the second embodiment of the surface lighting device. The light incident surface 131a of the light guiding plate 31, which faces the straight lamp 32, includes a central surface portion 131a1 and two inclined surface portions (light guiding device) 131a2 which are respectively positioned at the opposite ends of the central surface portion 131a1. The central surface portion 131a1 extends substantially parallel to the straight lamp 32 with a predetermined space between the central surface portion 131a1 and the straight lamp 32. The two inclined surface portions 131a2 are formed in the vicinity of the two electrode portions 32a of the straight lamp 32, respectively, and each inclined surface portion 131a 2 is inclined with respect to the straight lamp 32 and gradually approaches the corresponding electrode portion 32a in a direction away from the central surface portion 131a1.

Therefore, the light emitted from the straight lamp 32 in a direction perpendicular to the axial direction of the straight lamp 32 is incident on the central surface portion 131a1. Furthermore, the light which is emitted in a direction obliquely outwards from each of the opposite end portions of the light emitting section of the straight lamp 32, respectively adjacent to the two electrode portions 32a, is incident on the corresponding inclined surface portion 131a2; and the light which is emitted from each of the opposite end portions of the light emitting section of the straight lamp 32 respectively adjacent to the two electrode portions 32a in a direction perpendicular to the straight lamp 32 is also incident on the corresponding inclined surface portion 131a2. According to this structure of the light guiding plate 31, the light incident surface 131a of the light guiding plate 31 receives light emitted from the straight lamp 32 uniformly, i.e., not only from a central major part of the straight lamp 32 but also from the opposite end portions of the light emitting section of the straight lamp 32 which are respectively adjacent to the electrode portions 32a. Consequently, the brightness at each of two corners of the light guiding plate 31 which respectively face the opposite ends of the straight lamp 32 is improved. This prevents the dark portions B shown in FIG. 7 from occurring.

The light incident surface 131a shown in FIG. 11 can be replaced by a light incident surface 231a shown by a two-dot chain line in FIG. 11 to attain a similar effect. The light incident surface 231a, which faces the straight lamp 32, includes a central surface portion 231a1 and two arc surface portions (light guiding device) 231a2 which are respectively positioned at the opposite ends of the central surface portion 231a1. The central surface portion 231a1 extends substantially parallel to the straight lamp 32 with a predetermined space between the central surface portion 231a1 and the straight lamp 32. The two arc surface portions 231a2 are formed in the vicinity of the two electrode portions 32a of the straight lamp 32, respectively, and each arc surface portion 231a2 is curved to gradually approach the straight lamp 32 in a direction away from the central surface 231a1.

Therefore, the light emitted from the straight lamp 32 in a direction perpendicular to the axial direction of the straight lamp 32 is incident on the central surface portion 231a1. Furthermore, the light which is emitted in a direction obliquely outwards from each of the opposite end portions of the light emitting section of the straight lamp 32, respectively adjacent to the two electrode portions 32a, is incident on the corresponding arc surface portion 231a2; and the light which is emitted from each of the opposite end portions of the light emitting section of the straight lamp 32 respectively adjacent to the two electrode portions 32a in a direction perpendicular to the straight lamp 32 is also incident on the corresponding arc surface portion 231a2. According to this structure of the light guiding plate 31, the light incident surface 231a receives light emitted from the straight lamp 32 uniformly, i.e., not only from a central major part of the straight lamp 32 but also from the opposite end portions of the light emitting section of the straight lamp 32 which are respectively adjacent to the electrode portions 32a. Consequently, the brightness at each of two corners of the light guiding plate 31 which respectively face the opposite ends of the straight lamp 32 is improved. This prevents the dark portions B shown in FIG. 7 from occurring.

Figure 12A:
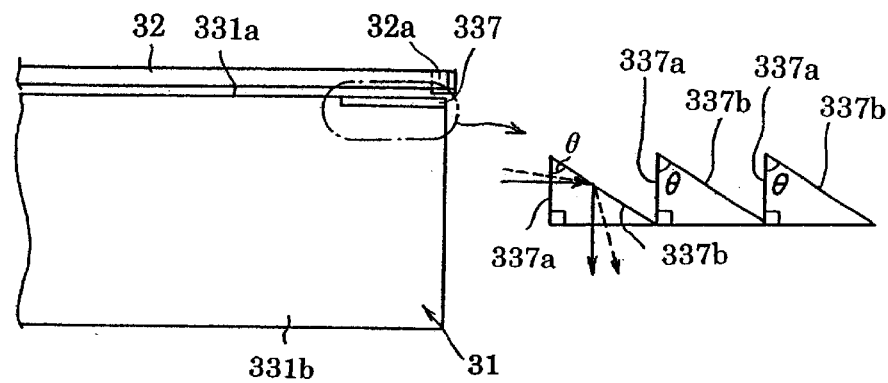
FIG. 12A is a fragmentary plan view of a light guiding plate and a straight lamp of the fourth embodiment of the surface lighting device according to the present invention.
Figure 12B:
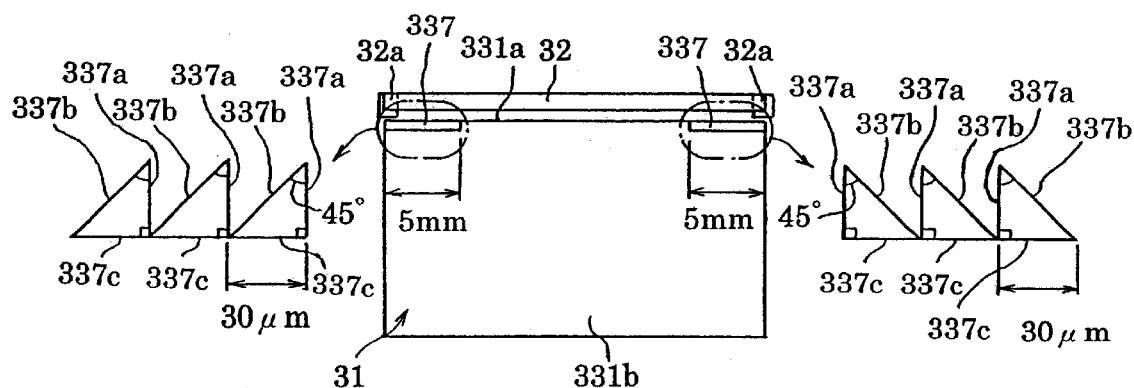
FIG. 12B is a plan view of the light guiding plate and the straight lamp of the surface lighting device shown in FIG. 12A.

FIGS. 12A and 12B show a fundamental portion of the fourth embodiment of the surface lighting device according to the present invention. The fourth embodiment of the surface lighting device is substantially the same as the second embodiment of the surface lighting device 30 shown in FIGS. 6 and 7 except that the light guiding plate 31 is provided with a light incident surface 331a having a particular structure unique to the fourth embodiment of the surface lighting device instead of the flat light incident surface 31a of the second embodiment of the surface lighting device. The light guiding plate 31 is provided, on the light incident surface 331a thereof which faces the straight lamp 32, with two sawtooth-like portions (light guiding device) 337 which are positioned at the opposite ends of the light incident surface 331a in the vicinity of the electrode portions 32a, respectively. Each sawtooth-like portion 337 is made of an array of prism portions, each prism of which has a first surface 337a and a second surface 337b. Part of the light emitted from the straight lamp 32 is incident on the first surface 337a. The light which is passed through the first surface 337a is reflected by an inner surface of the second surface 337b to proceed toward the portion of the light guiding plate 31 which faces the corresponding end of the straight lamp 32. The first surface 337a extends perpendicular to both the light incident surface 331a and a light exit surface 331b of the light guiding plate 31, and the second surface 337b extends obliquely to both the light incident surface 331a and the first surface 337a, and perpendicularly to the light exit surface 331b. The interior angle formed between the first and second surfaces 337a and 337b of each prism portion is set in the range of approximately 40 to 55 degrees. Each sawtooth-like portion 337 (i.e., first surfaces 337a) extends in a direction parallel to the axial direction of the straight lamp 32. Each of the first and second surfaces 337a and 337b can be formed as a mat surface to make each of the first and second surfaces serve as a diffusion surface through which the incident light thereon is diffused. In this case, the central average surface height of the mat surface is in a range of 0.4 to 1.0 μm.

As shown in FIG. 12A, a ray of light shown by a broken line which is emitted obliquely from the straight lamp 32 to be incident on one first surface 337a is totally reflected by the inner surface of the corresponding second surface 337b to proceed toward the inside of the light guiding plate 31. Likewise, another ray of light shown by a solid line which is emitted from the straight lamp 32 in a direction parallel to the axial direction thereof to be incident on one first surface 337a is totally reflected by the inner surface of the corresponding second surface 337b to proceed toward the inside of the light guiding plate 31. Accordingly, since each first surface 337a and the corresponding second surface 337b form one prism of an array of prism portions, the light which is incident on each first surface 337a is totally reflected by the corresponding second surface 337b, to proceed toward the inside of the light guiding plate 31, due to the total internal reflection characteristic of the prism. Consequently, the brightness is improved at each of the two corners of the light guiding plate 31 which respectively face the opposite ends of the straight lamp 32. This prevents the dark portions B shown in FIG. 7 from occurring. If the interior angle formed between each first surface 337a and the corresponding second surface 337b is set in the range of approximately 40 to 55 degrees as mentioned above, the incident light on the first surface 337a can be totally reflected by the corresponding second surface 337b. This utilizes the incident light on the first surfaces 337a as much as possible, so as to proceed toward the inside of the light guiding plate 31. Consequently, the incident light on the first surfaces 337a can be made to proceed toward the inside of the light guiding plate 31 so as to sufficiently prevent the dark portions B shown in FIG. 7 from occurring. In addition, providing the light guiding plate 31 with more than one prism portion, each of which being formed by one first surface 337a and one second surface 337b so as to have a sawtooth shape, makes it possible to expand the area of a light incident surface on the light incident surface 331a in the vicinity of each of two corners of the light guiding plate 31 which respectively face the opposite ends of the straight lamp 32. This also helps prevent the dark portions B shown in FIG. 7 from occurring.

Figure 13:
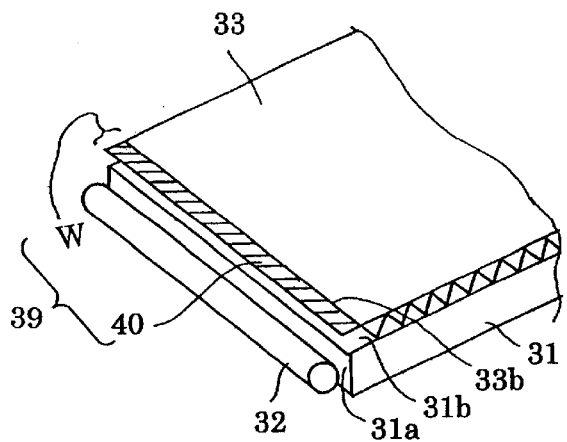
FIG. 13 is a fragmentary perspective view of fundamental elements of the fifth embodiment of the surface lighting device according to the present invention.

FIG. 13 shows a fundamental portion of the fifth embodiment of the surface lighting device. The fifth embodiment of the surface lighting device is substantially the same as the second embodiment of the surface lighting device 30 shown in FIGS. 6 and 7 except that the prism sheet 33 is slightly shifted relative to the light guiding plate 31 in a direction away from the light incident surface 31a, and that the surface lighting device is further provided with an extraordinary-ray shield device 39 which prevents the bright and dark streaks A (see FIG. 7) from occurring in the vicinity of the end of the light exit surface 31b of the light guiding plate 31 which is adjacent to the straight lamp 32.

A light shield strip (e.g., a light shield film) 40 which extends parallel to both the straight lamp 32 and the light exit surface 31b is fixed at one end 33b of the prism sheet 33, which faces the straight lamp 32, so that a predetermined space W is formed between the light shield strip 40 and the light exit surface 31b. The extraordinary-ray shield device 39 is composed of the light shield strip 40 and the space W. The width of the space W from the light incident surface 31a to the end 33b of the prism sheet 33 in a direction perpendicular to the longitudinal direction of said light incident surface 31a and parallel to the light exit surface 31b is preferably in the range of 0.5 to 10.0 mm.

In the fifth embodiment of the surface lighting device shown in FIG. 13, extraordinary rays which are emitted from the straight lamp 32 to proceed toward the light incident surface 31a from front thereof are absorbed by the light shield film 40 so as not to be incident on the light exit surface 31b from the front thereof. This prevents the bright and dark streaks A (see FIG. 7) which may be produced due to such extraordinary rays from occurring in the vicinity of the end of the light exit surface 31b of the light guiding plate 31 which is adjacent to the straight lamp 32.

FIG. 17 shows a fundamental portion of the sixth embodiment of the surface lighting device. The sixth embodiment of the surface lighting device is substantially the same as the second embodiment of the surface lighting device 30 shown in FIGS. 6 and 7 except that the sixth embodiment of the surface lighting device is further provided with an extraordinary-ray shield device 139 which prevents the bright and dark streaks A (see FIG. 7) from occurring in the vicinity of the end of the light exit surface 31b of the light guiding plate 31 which is adjacent to the straight lamp 32. The extraordinary-ray shield device 139 is composed of front and rear tongue portions 35b and front and rear low-reflectivity areas 120. The front and rear tongue portions 35b are formed integral with the tube-like reflector 35 to extend substantially parallel to each other in a direction away from the straight lamp 32 along the front surface (i.e., light exit surface 31b) and the rear surface of the light guiding plate 31, respectively. The front and rear low-reflectivity areas 120 are formed on the opposed inner surfaces of the front and rear tongue portions 35b, respectively, so that the front low-reflectivity area 120 is positioned between the front tongue portion 35b and the front surface of the light guiding plate 31 and so that the rear low-reflectivity area 120 is positioned between the rear tongue portion 35b and the rear surface of the light guiding plate 31. A slight gap is formed between the front low-reflectivity area 120 and the light exit surface 31b of the light guiding plate 31, and a similar slight gap is formed between the rear low-reflectivity area 120 and the surface of the light guiding plate 31. The front and rear low-reflectivity areas 120 can be formed by forming an ink print area on each of the opposed inner surfaces of the front and rear tongue portions 35b or by applying a coating of fine particles such as fine beads to each of the opposed inner surfaces of the front and rear tongue portions 35b.

In the tube-like reflector 35 shown in FIG. 17, extraordinary rays which are emitted from the straight lamp 32 to proceed toward the light incident surface 31a of the light guiding plate 31 from front thereof are absorbed by the front low-reflectivity area 120 so as not to be incident on the light exit surface 31b from the front thereof, and other extraordinary rays which are emitted from the straight lamp 32 to proceed toward the rear surface of the light guiding plate 31 from rear thereof are absorbed by the rear low-reflectivity area 120 so as not to be incident on the light exit surface 31b from the rear thereof. This prevents the bright and dark streaks A (see FIG. 7) which may be produced due to such extraordinary rays from occurring in the vicinity of that end of the light exit surface 31b of the light guiding plate 31 which is adjacent to the straight lamp 32.

Figure 14A:
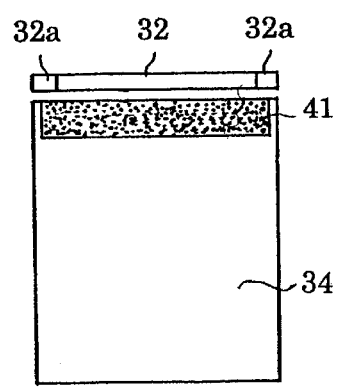
FIG. 14A is a plan view of a reflector plate and a straight lamp of the seventh embodiment of the surface lighting device according to the present invention.
Figure 14B:
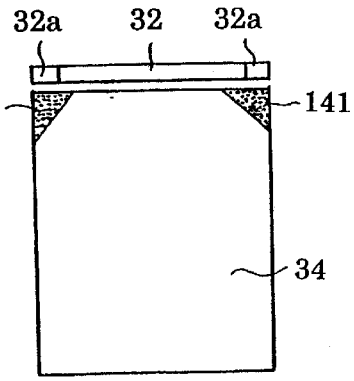
FIG. 14B is a plan view of a reflector plate and a straight lamp of the eighth embodiment of the surface lighting device according to the present invention.

FIG. 14A shows fundamental portions of the seventh embodiment of the surface lighting devices according to the present invention, and FIG. 14B shows fundamental portions of the eighth embodiment of the surface lighting devices according to the present invention. Each of the seventh and eighth embodiments of the surface lighting devices is substantially the same as the second embodiment of the surface lighting device 30 shown in FIGS. 6 and 7 except that the reflector plate 34 is provided thereon with a partial diffusion reflector (41 or 141) that diffuses part of the incident light on the reflector plate 34 toward the light exit surface 31b of the light guiding plate 31. In each of FIGS. 14A and 14B, only the straight lamp 32 and the reflector plate 34 are shown. In the seventh embodiment of the surface lighting device shown in FIG. 14A, the reflector plate 34 is provided with a diffusion reflector surface (partial diffusion reflector) 41 which is formed on the front surface of the reflector plate 34 to extend parallel to the straight lamp 32 along a side of the reflector plate 34 which is adjacent to the straight lamp 32. The light which is incident on the diffusion reflector surface 41 is diffused thereby to proceed toward the light exit surface 31b. The diffusion reflector surface 41 is formed so that the degree of light diffusion thereof increases in a direction toward an end (upper end as viewed in FIG. 14A) of the reflector plate 34 which is adjacent to the straight lamp 32. The diffusion reflector surface 41 having such a light diffusing capability is formed, e.g., by forming (printing) a dot pattern (print pattern) on the corresponding part of the front surface of the reflector plate 34 with ink having a high diffusion reflectance.

In the eighth embodiment of the surface lighting device shown in FIG. 14B, the reflector plate 34 is provided with two diffusion reflector surfaces 141 (partial diffusion reflector) which are formed on the front surface of the reflector plate 34 at two corners thereof facing the opposite ends of the straight lamp 32, respectively. Each of the two diffusion reflector surfaces 141 is formed so that the degree of light diffusion thereof decreases in a direction toward the center of the front surface of the reflector plate 34. Similar to the diffusion reflector surface 41 shown in FIG. 14A, each diffusion reflector surface 141 having such a light diffusing capability is formed, e.g., by forming (printing) a dot pattern (print pattern) on the corresponding part of the front surface of the reflector plate 34 with ink having a high diffusion reflectance, preferably a higher diffusion reflectance than the diffusion reflectance of the ink used for the diffusion reflector surface 41 shown in FIG. 14A.

According to the partial diffusion reflector 41 shown in FIG. 14A, the bright and dark streaks A (see FIG. 7), which may occur in the vicinity of the end of the light exit surface 31b of the light guiding plate 31 which is adjacent to the straight lamp 32, can be prevented from occurring.

According to the partial diffusion reflector 141 shown in FIG. 14B, each dark portion B (see FIG. 7), which may occur at each of two corners of the light guiding plate 31 which respectively face the opposite ends of the straight lamp 32, can be prevented from occurring.

Figure 3:
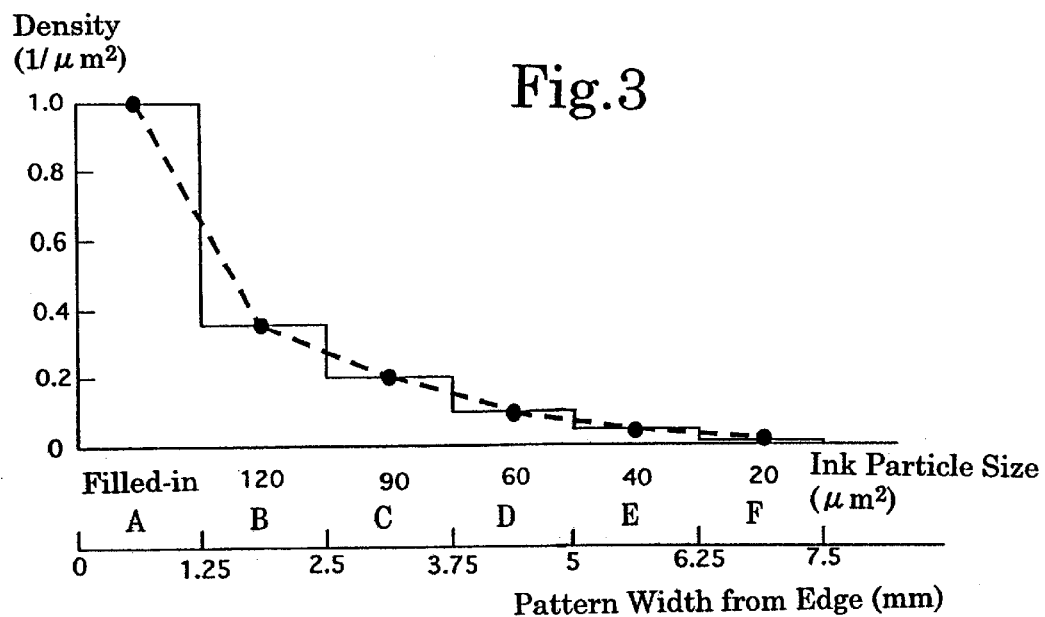
FIG. 3 is a graph showing an example of a print pattern printed on the diffusion reflector surface of the reflector plate shown in FIG. 14A.
Figure 5:
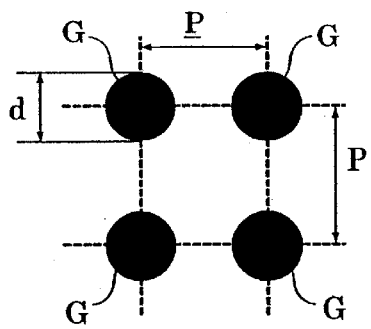
FIG. 5 is a conceptual view of ink particles used to print the print pattern shown in FIG. 4, showing the particle size and the pitch thereof.

FIG. 3 is a graph showing an example of an ink print pattern printed on the diffusion reflector surface 41. FIG. 4 is an explanatory view of the ink print pattern shown in FIG. 3. FIG. 5 is a conceptual diagram of particles of ink used to print the ink print pattern, showing a particle size d of ink particle G and a pitch P. The degree of light diffusion of the diffusion reflector surface 41 (namely, the reflectivity of the diffusion reflector surface 41) is determined by a combination of the particle size d and the pitch P of ink (colored or transparent ink) that are shown conceptually in FIG. 5. In the example shown in FIGS. 3 and 4, the diffusion reflector surface 41 is divided into six sections A, B, C, D, E and F, the pitch P is fixed at 125 μm (see FIG. 5), and the particle size d increases stepwise in a direction toward an end (upper end as viewed in FIG. 14A) of the reflector plate 34 which is adjacent to the straight lamp 32, i.e., in an upward direction as viewed in FIG. 4. Ink to be used to print the ink print pattern on the diffusion reflector surface 41 is of a type having a high diffusion reflectance. Specifically, the section A is a filled-in section (or a solidly shaded section), while the particle size d of sections B, C, D, E and F are set at 120 μm, 90 μm, 60 μm, 40 μm and 20 μm, respectively, to change the degree of light diffusion in stages. The section A (filled-in section) is very high in diffusion reflectance, and extends to overlap an area on the reflector plate 34 which corresponds to a display indication area.

Each of the two diffusion reflector surfaces 141 shown in FIG. 14B can be formed with ink having a high diffusion reflectance in a manner similar to that shown in FIGS. 3, 4 and 5.

Each diffusion reflector surface 41 or 141 can be formed not only by forming a print pattern on the corresponding part of the front surface of the reflector plate 34 with ink, but also by applying a coating of fine particles such as fine beads to the corresponding part of the front surface of the reflector plate 34. Although the minimum work-surface pattern on the reflector plate 34 in a fine-bead application becomes greater than that in the ink application, similar effects can be expected in the fine-bead application. The characteristics of each of the seventh and eighth embodiments of the surface lighting device 10 can be fully utilized especially when the LCD panel needs to produce high-brightness images.

FIG. 16 shows another embodiment of the light guiding plate 31 shown in FIG. 6. As shown in FIG. 16, the light guiding plate 31 has a substantially wedge shape in cross section, wherein the thickness of the light guiding plate 31 gradually decreases in a direction away from the light incident surface 31a of the light guiding plate 31, i.e., in a rightward direction as viewed in FIG. 16. Similar to the light guiding plate 11 shown in FIG. 1, the light guiding plate 31 is provided on a front surface (the upper surface as viewed in FIG. 16) thereof with a first array of minute parallel prism projections (not shown) extending parallel to the straight lamp 32, while the light guiding plate 31 is provided on a rear surface (lower surface as viewed in FIG. 16) thereof with a second array of minute parallel prism projections (not shown) extending in a direction perpendicular to the straight lamp 32. The first and second arrays of minute parallel prism projections of this embodiment of the light guiding plate 31 are formed in the same manner as those formed on the light guiding plate 11 shown in FIG. 1. The light incident surface 31a extends perpendicular to a rear surface 31d of the light guiding plate 31 which faces the reflector plate 34. Likewise, an end surface 31c of the light guiding plate 31, which is positioned on the opposite side of the light guiding plate 31 from the light incident surface 31a, extends perpendicular to the rear surface 31d of the light guiding plate 31. Accordingly, an angle β1 between the light incident surface 31a and the rear surface 31d and an angle β2 between the end surface 31c and the rear surface 31d are right angles; an angle γ1 between the light incident surface 31a and the light exit surface 31b is an acute angle; and an angle γ2 between the end surface 31c and the light exit surface 31b is an obtuse angle. Therefore, the light incident surface 31a is inclined with respect to a plane normal to the light exit surface 31b. Furthermore, the light incident surface 31a and the end surface 31c extend parallel to each other. In the case of the light guiding plate 31 shown in FIG. 16, the bright and dark streaks A (see FIG. 7) can be prevented from occurring in the vicinity of the end of the light exit surface 31b of the light guiding plate 31 (which is adjacent to the straight lamp 32) more effectively than using the light guiding plate 31 shown in FIG. 6. The angle β1 and the angle β2 can be an obtuse angle and an acute angle, respectively, as long as the light incident surface 31a and the end surface 31c extend parallel to each other.

Examples 1 and 2 which respectively embody the above-described second and fourth embodiments of the surface lighting devices will be hereinafter discussed.

In Example 1, the light guiding plate 31 shown in FIG. 16 on which the first and second arrays of minute parallel prism projections are formed is used, and the reflector 35 shown in FIG. 17 that is provided with the extraordinary-ray shield device 139 is used. The light guiding plate 31 is made of a transparent acrylic resin, and is formed via injection molding as a 14.1 inch diagonal plate which has a substantially wedge shape in cross section so that the thickness at one end (at which the light incident surface 31a is formed) and the other end (at which the end surface 31c is formed) of the light guiding plate 31 are 2.4 mm and 1.0 mm, respectively. The interior angle α of the apex of each prism projection of the first array of prism projections, which is formed on the light exit surface 31b to extend parallel to the straight lamp 32, is set at 174 degrees, while the interior angle β of the apex of each prism projection of the second array of prism projections, which is formed on the light exit surface 31b to extend in a direction perpendicular to the straight lamp 32, is set at 130 degrees. The pitch S of prism projections of each array of the first and second arrays is set at 30 μm. Each of the first and second arrays of prism projection is formed on the light guiding plate 31 with a diamond cutting tool. A CCFL (cold cathode fluorescent lamp) which serves as the straight lamp 32 is positioned to face the light incident surface 31a, which is formed on an elongated side (longer side) of the light guiding plate 31.

A high-brightness reflection sheet made by TSUJIDEN Co., Ltd., which serves as the reflector sheet 34 (see FIG. 6) is positioned below the light guiding plate 31. The tube-like reflector 35, an inner surface of which a diffusion sheet made by MITSUBISHI PLASTICS, INC. (trade name "ALSET") is adhered to, is positioned around the straight lamp 32.

These elements (the light guiding plate 31, the straight lamp 32, the reflector sheet 34 and the tube-like reflector 35) are mounted to an appropriate frame member (not shown). On the other hand, a prism sheet made by MITSUBISHI RAYON CO., LTD. (trade name "DIA ART": product No. M165), which has the interior angle α (see FIG. 10B) of 65 degrees and which serves as the prism sheet 33 is mounted on the light guiding plate 31 so that the ridges of all the prism projections face the light exit surface 31b of the light guiding plate 31 and extend in a direction parallel to the straight lamp 32.

Example 1 of the surface lighting device having the above described structure is compared with a comparative example of a surface lighting device (Comparative Example 1) which is identical to Example 1 except that the rear surface of the light guiding plate 31 in Comparative Example 1 is formed as a flat surface with no array of minute parallel prism projections corresponding to the second array of minute parallel prism projections 11b shown in FIG. 1.

FIG. 15 shows a data table of the intensity (central intensity) at a central portion of the light guiding plate 31 and the half width distribution angle of the luminous intensity in Example 1 and Comparative Example 1. As shown in FIG. 15, the central intensity in Example 1 is greater than that in Comparative Example 1, while the half width distribution angle in Example 1 is smaller than that in Comparative Example 1.

In addition, fine glass beads are blown against the light incident surface 31a of the light guiding plate 31 of Example 1 so that the light incident surface 31a is formed as a mat surface so as to serve as a diffusion surface through which the incident light on the light incident surface is diffused. Center line average height Ra of the light incident surface 31a measures 0.7 μm by a surface roughness tester manufactured by TOKYO SEIMITSU CO., LTD. Visual observations are made on these two surface lighting devices (Example 1 and Comparative Example 1) in a state where the straight lamp 32 of each surface lighting device is ON to see if the bright and dark streaks A (see FIG. 7) may occur. As a result, the bright and dark streaks A are hardly seen in Example 1, while the same is clearly seen in Comparative Example 1.

Example 2

Example 2 of the surface lighting device is prepared having the same structure as Example 1 except that Example 2 is further provided with the sawtooth-like portions 337 (see FIGS. 12A and 12B). As shown in FIG. 12B, the width of each prism portion (i.e., the length of the base 337c of each prism portion) of each sawtooth-like portion 337 in a direction parallel to the axial direction of the straight lamp 32 is set at 30 μm, and the width of each of the two sawtooth-like portions 337 is set at approximately 5 mm. Each sawtooth-like portion 337 is formed integral with the light guiding plate by molding.

The light guiding plate 31, which has a substantially wedge shape cross section, is formed as a 14-inch diagonal plate so that the thickness at one end (at which the light incident surface 31a is formed) and the other end (at which the end surface 31c is formed) of the light guiding plate 31 are 2.4 mm and 1.0 mm, respectively. The angle β1 between the light incident surface 31a and the rear surface 31d, the angle β2 between the end surface 31c and the rear surface 31d, the angle γ1 between the light incident surface 31a and the light exit surface 31b and the angle γ2 between the end surface 31c and the light exit surface 31b are set at 90 degrees, 90 degrees, 89.58 degrees, and 90.42 degrees, respectively. Therefore, an angle η1 shown in FIG. 16 between the light incident surface 31a and a plane perpendicular to the light incident surface 31b is 0.42 degrees, and an angle η2 shown in FIG. 16 between the end surface 31c and a plane perpendicular to the light incident surface 31b is also 0.42 degrees.

Visual observation is made on Example 2 of the surface lighting device with the straight lamp 32 ON to see if the dark portions B (see FIG. 7) may occur. As a result, the dark portions B are hardly seen in Example 2 at the two corners of the light guiding plate 31 which respectively face the opposite ends of the straight lamp 32.

Example 2 of the surface lighting device having the above described structure is compared with a comparative example of a surface lighting device (Comparative Example 2) which is made to be the same as Example 2 except that the light guiding plate 31 is formed so that the angle β1 between the light incident surface 31a and the rear surface 31d, the angle β2 between the end surface 31c and the rear surface 31d, the angle γ1 between the light incident surface 31a and the light exit surface 31b and the angle γ2 between the end surface 31c and the light exit surface 31b are set at 89.58 degrees, 90.42 degrees, 90 degrees, and 90 degrees, respectively.

Luminance distribution is measured on these two surface lighting devices (Example 2 and Comparative Example 2). An intensity distribution measuring system made by HI-LAND CO., LTD., is used for the measurement. The measurement is made from a point at which the light incident surface 31a is formed toward the center of the screen of the surface lighting device in a direction perpendicular to the straight lamp 32 to measure luminance distribution at intervals of 0.1 mm (pixel by pixel) on condition that the CCD camera of the intensity distribution measuring system is in a close-up position.

Figure 18:
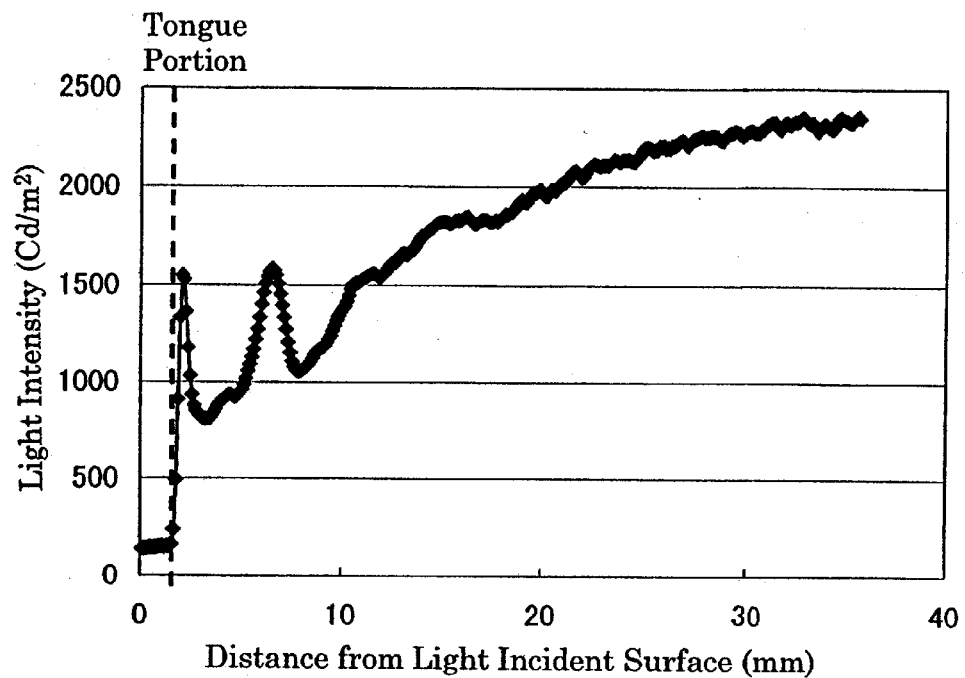
FIG. 18 is a graph showing the variation in intensity of the light emitted from the light guiding plate of Comparative Example 2 due to the variation of the distance from the light incident surface.
Figure 19:
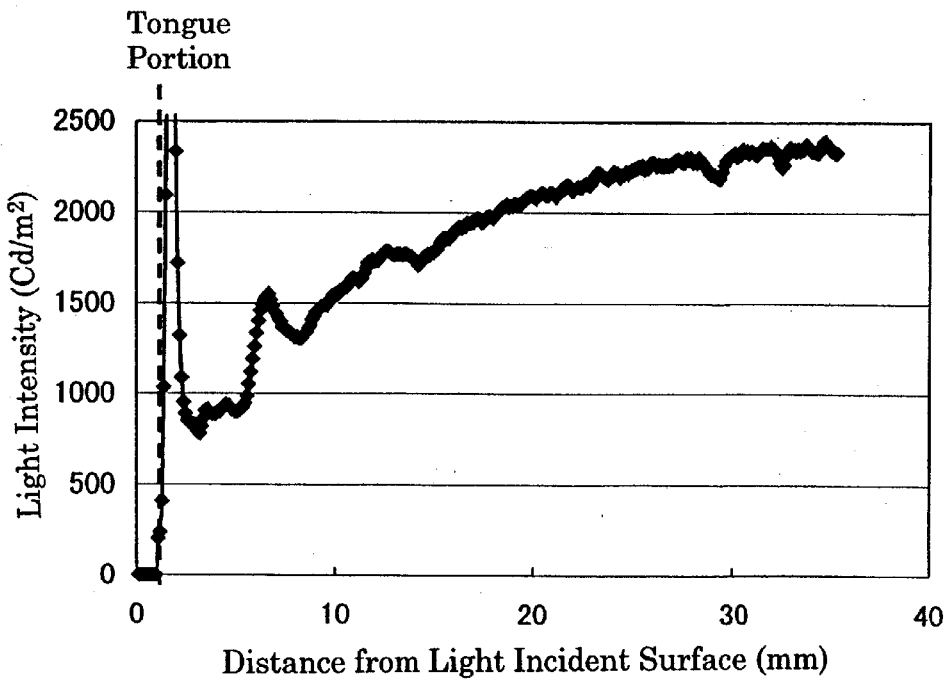
FIG. 19 is a graph similar to that shown in FIG. 18, showing the variation in intensity of the light emitted from the light guiding plate of Example 2 due to the variation of the distance from the light incident surface.

FIG. 18 is a graph showing the variation in intensity of the light emitted from the light guiding plate 31 of Comparative Example 2 due to the variation of the distance from the light incident surface 31a. FIG. 19 is a graph similar to that shown in FIG. 18, showing the variation in intensity of the light emitted from the light guiding plate 31 of Example 2 due to the variation of the distance from the light incident surface 31a. As can be clearly understood from the graph shown in FIG. 18, the intensity drops sharply to approximately 1000 cd/m² at a point approximately 8 mm distance from the light incident surface 31a in Comparative Example 2. However, as can be clearly seen from the graph shown in FIG. 19, the intensity drops only to approximately 1300 cd/m² at the same point in Example 2, so that the intensity at the particular point is improved. In addition, it is obvious that Example 2 of the surface lighting device is superior in luminance distribution to Comparative Example 2 by comparing the two graphs shown in FIGS. 18 and 19 since a trace in the graph shown in FIG. 19 is more gentle than that in the graph shown in FIG. 18. Note that "Tongue Portion" shown in each of the graphs in FIGS. 18 and 19 represents the portion on the light exit surface 31 which is covered by the front tongue portion 35b of the reflector 35.

As can be understood from the foregoing, according to the present invention, a surface lighting device is achieved which illuminates an LCD panel entirely with less unevenness in luminance distribution. Furthermore, according to the present invention, a surface lighting device with a high brightness which improves the quality of images indicated on an LCD panel is achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A surface lighting device comprising:
    a light guiding plate having a light incident surface formed at one end surface of said light guiding plate and a light exit surface formed on a front surface of said light guiding plate;
    an elongated light source which faces said light incident surface;
    a light source reflector which reflects light emitted from said elongated light source toward said light incident surface;
    a prism sheet, wherein an array of minute parallel prism projections is formed on a surface of said prism sheet, said prism sheet being positioned so that said array of minute parallel prism projections faces said light exit surface;
    a regular reflection type reflector positioned to face a rear surface of said light guiding plate;
    a light guiding device for guiding light emitted from said elongated light source to each of two portions of said light incident surface which respectively face opposite ends of said elongated light source; and
    a diffuser, formed on said light incident surface, which diffuses incident light thereon.

2. The surface lighting device according to claim 1, further comprising a diffusion reflector, formed on said regular reflection type reflector, which diffuses part of incident light on said regular reflection type reflector.

3. The surface lighting device according to claim 1, wherein said light incident surface is inclined with respect to a plane normal to said light exit surface.

4. The surface lighting device according to claim 1, wherein said light guiding plate comprises:
    a first array of minute parallel prism projections formed on one of said front surface and said rear surface of said light guiding plate to extend in a first direction; and
    a second array of minute parallel prism projections formed on the other of said front surface and said rear surface of said light guiding plate to extend in a second direction perpendicular to said first direction.

5. The surface lighting device according to claim 1, wherein said light guiding plate has a substantially wedge shape cross section;
    wherein a thickness of said light guiding plate gradually decreases in a direction away from said light incident surface; and
    wherein a first angle between said light incident surface and said light exit surface of said light guiding plate and a second angle between said light incident surface and said rear surface of said light guiding plate are an acute angle and one of a right angle and an obtuse angle, respectively.

6. The surface lighting device according to claim 5, wherein said light incident surface, which is formed on said one end surface of said light guiding plate, and the other end surface of said light guiding plate, which is positioned on the opposite side of said light guiding plate from said light incident surface thereof, are parallel to each other.

7. The surface lighting device according to claim 1, wherein said light source reflector comprises a second diffuser which diffuses light emitted from said elongated light source.

8. The surface lighting device according to claim 1, wherein said light source reflector comprises an extraordinary ray shield device which prevents light emitted from said elongated light source from being incident on said light exit surface from the front side thereof, and further prevents other light emitted from said elongated light source from being incident on said rear surface of said light guiding plate from the rear side thereof.

9. The surface lighting device according to claim 8, wherein said extraordinary ray shield device comprises:
    front and rear tongue portions formed integral with said light source reflector to extend in a direction away from said elongated light source along said light exit surface and said rear surface of said light guiding plate, respectively; and
    front and rear low-reflectivity areas positioned between said front tongue portion and said light exit surface of said light guiding plate and between said rear tongue portion and said rear surface of said light guiding plate, respectively.

10. The surface lighting device according to claim 9, wherein said front and rear low-reflectivity areas are formed on said front and rear tongue portions, respectively.

11. The surface lighting device according to claim 1, wherein said light guiding device comprises two light guiding members fixed at said opposite ends of said elongated light source to surround two electrode portions formed at said opposite ends of said elongated light source, respectively.

12. The surface lighting device according to claim 11, wherein each of said two light guiding members is formed as a cylindrical cap to be fitted on a corresponding one of said electrode portions.

13. The surface lighting device according to claim 1, wherein said light guiding device comprises two inclined surface portions formed on said light incident surface at opposite ends thereof in the vicinity of two electrode portions which are formed at said opposite ends of said elongated light source, respectively; and wherein each of said two inclined surface portions is inclined with respect to said elongated light source to gradually approach a corresponding one of said electrode portions in a direction away from a central surface portion of said light incident surface.

14. The surface lighting device according to claim 1, wherein said light guiding device comprises two arc surface portions formed on said light incident surface at opposite ends thereof in the vicinity of two electrode portions which are formed at said opposite ends of said elongated light source, respectively; and wherein each of said two arc surface portions is curved to gradually approach a corresponding one of said electrode portions in a direction away from a central surface portion of said light incident surface.

15. The surface lighting device according to claim 1, wherein said light guiding device comprises:

at least one first surface on which part of said light emitted from said elongated light source is incident; and at least one second surface which reflects said light incident on said at least one first surface to proceed toward the inside of said light guiding plate.

16. The surface lighting device according to claim 15, wherein said at least one first surface is angled relative to said at least one second surface by an angle of approximately 40 to 55 degrees.

17. The surface lighting device according to claim 15, wherein said at least one first surface and said at least one second surface constitute a plurality of first surfaces and a plurality of second surfaces, respectively, which form two sawtooth-like portions on said light incident surface at opposite ends thereof.

18. The surface lighting device according to claim 15, wherein each of said at least one first surface and said at least one second surface is formed as a mat surface.

19. The surface lighting device according to claim 1, wherein said light incident surface is formed as a mat surface.

20. The surface lighting device according to claim 19, wherein a central average surface height of said mat surface is in a range of $0.4\mu$ to $1.0 \mu m$.

21. The surface lighting device according to claim 1, wherein said prism sheet comprises an extraordinary ray shield device which prevents light emitted from said elongated light source from being incident on said light exit surface from front thereof.

22. The surface lighting device according to claim 21, wherein said prism sheet is slightly shifted relative to said light guiding plate in a direction away from said light incident surface so that a predetermined space is formed between said light shield strip and said light exit surface; and wherein said extraordinary ray shield device comprises a light shield strip which is positioned above said predetermined space to extend from one end of said prism sheet which faces said elongated light source.

23. The surface lighting device according to claim 22, wherein a width of said space between said light incident surface and said one end of said prism sheet, in a direction perpendicular to a longitudinal direction of said light incident surface and parallel to said light exit surface, is in a range of 0.5 mm to 10.0 mm.

24. The surface lighting device according to claim 1, wherein each of said light guiding plate and said regular reflection type reflector is formed as a rectangular plate; and wherein said diffusion reflector comprises two diffusion reflector surfaces formed on a front surface of said regular reflection type reflector at two corners thereof facing said opposite ends of said elongated light source, respectively.

25. The surface lighting device according to claim 24, wherein each of said two diffusion reflector surfaces comprises an ink print pattern printed on said front surface of said regular reflection type reflector so that the degree of light diffusion of said diffusion reflector surface decreases in a direction toward a center of said front surface of said regular reflection type reflector, wherein ink having a high diffusion reflectance is used to print said ink print pattern.

26. The surface lighting device according to claim 1, wherein said diffusion reflector comprises a diffusion reflector surface formed on a front surface of said regular reflection type reflector to extend parallel to said elongated light source along a side of the regular reflection type reflector which is adjacent to said elongated light source.

27. The surface lighting device according to claim 26, wherein said diffusion reflector surface comprises an ink print pattern printed on said front surface of said regular reflection type reflector so that the degree of light diffusion of said diffusion reflector surface increases in a direction toward an end of said regular reflection type reflector which is adjacent to said elongated light source, wherein ink having a high diffusion reflectance is used to print said ink print pattern.

28. A surface lighting device comprising:

a light guiding plate having a light incident surface formed at one end surface of said light guiding plate and a light exit surface formed on a front surface of said light guiding plate; and an elongated light source which faces said light incident surface;

wherein said light incident surface is inclined with respect to a plane normal to said light exit surface.

29. The surface lighting device according to claim 28, wherein said light guiding plate comprises:

a first array of minute parallel prism projections formed on one of said front surface and said rear surface of said light guiding plate to extend in a first direction; and a second array of minute parallel prism projections formed on the other of said front surface and said rear surface of said light guiding plate to extend in a second direction perpendicular to said first direction.

30. The surface lighting device according to claim 28, wherein said light guiding plate has a substantially wedge shape cross section;

wherein a thickness of said light guiding plate gradually decreases in a direction away from said light incident surface; and wherein a first angle between said light incident surface and said light exit surface of said light guiding plate and a second angle between said light incident surface and said rear surface of said light guiding plate are an acute angle and one of a right angle and an obtuse angle, respectively.

31. The surface lighting device according to claim 30, wherein said light incident surface, which is formed on said one end surface of said light guiding plate, and the other end surface of said light guiding plate, which is positioned on the opposite side of said light guiding plate from said light incident surface thereof, are parallel to each other.

32. The surface lighting device according to claim 4, wherein said first direction is parallel to an axial direction of said elongated light source.

\* \* \* \* \*